Figure 1:
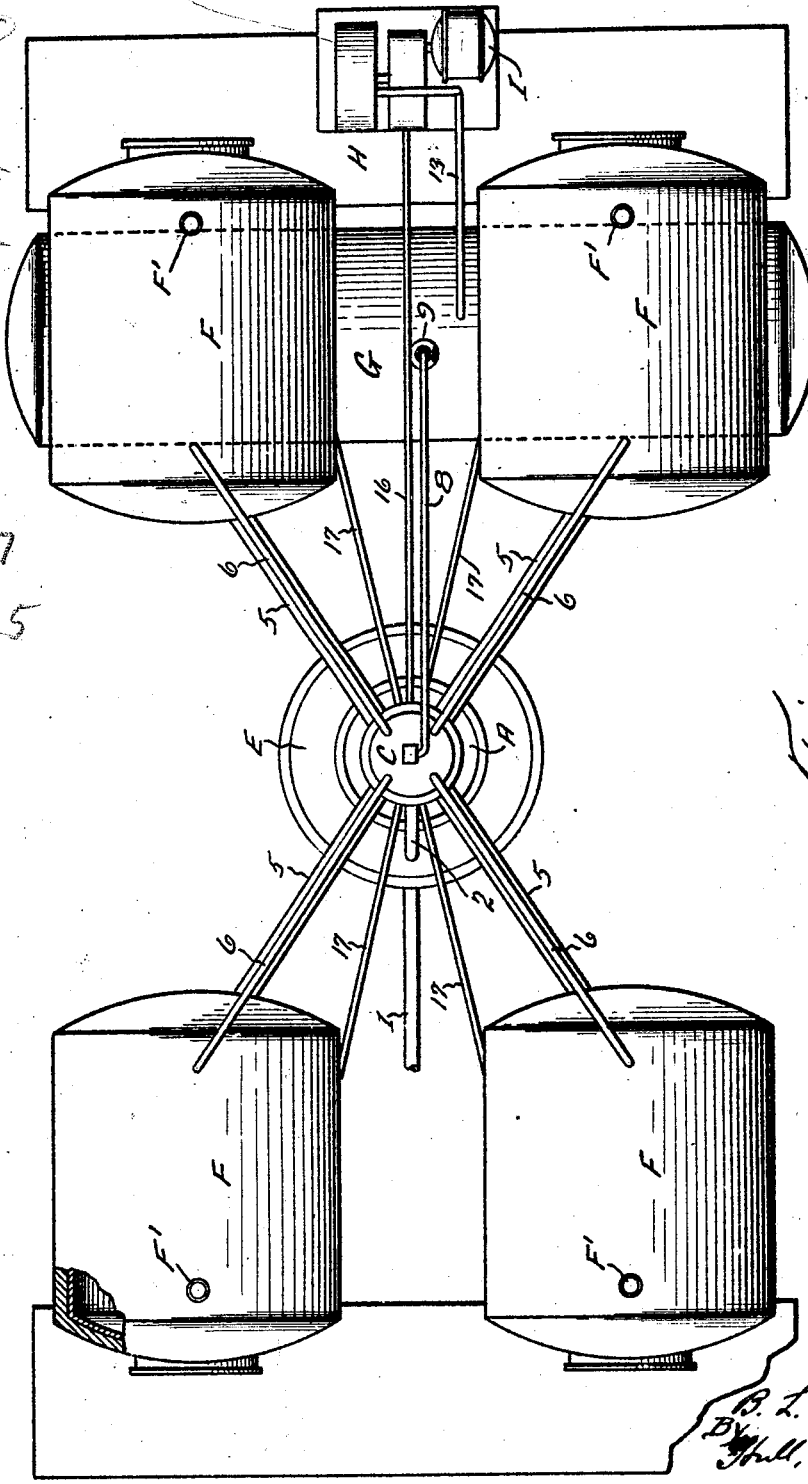

Feb. 19, 1929. B. L. HARTZ 1,702,897
SYSTEM OR APPARATUS FOR HOLDING MILK
Filed June 1, 1925  3 Sheets-Sheet 1

Inventor
B. L. Hartz

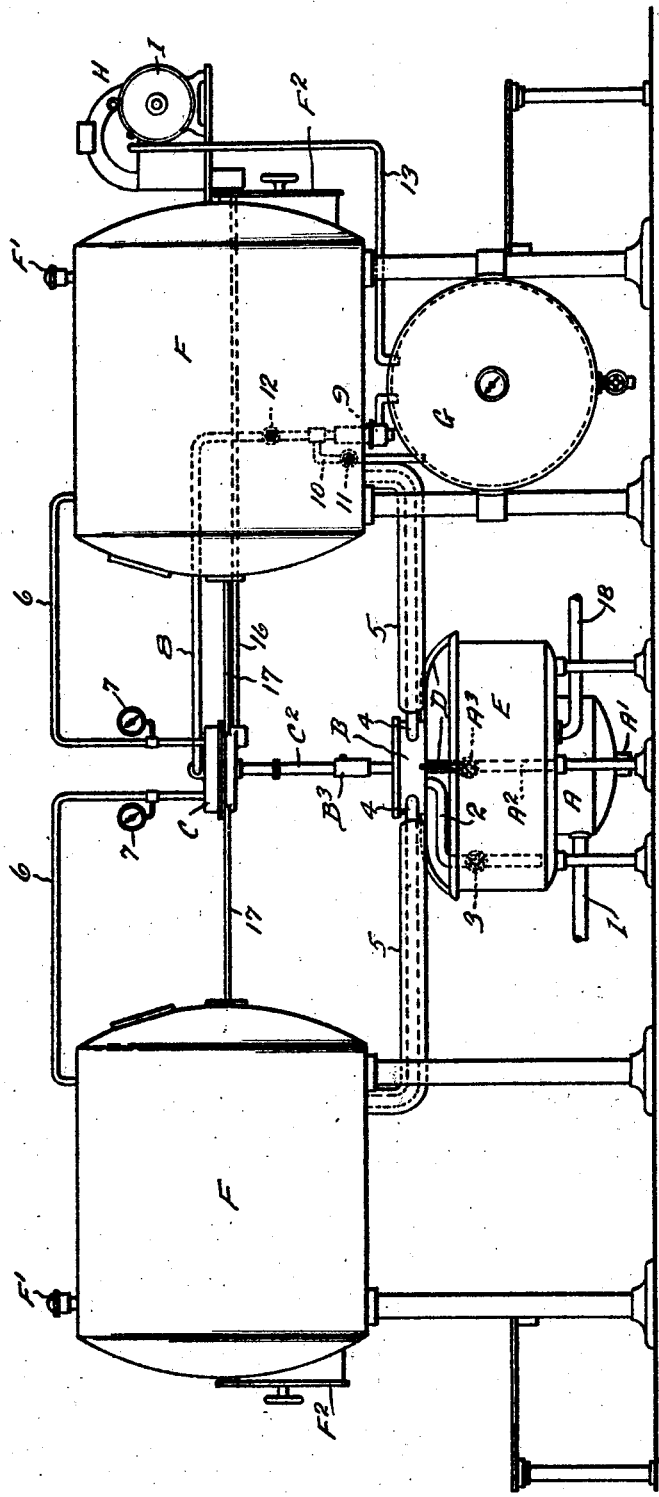

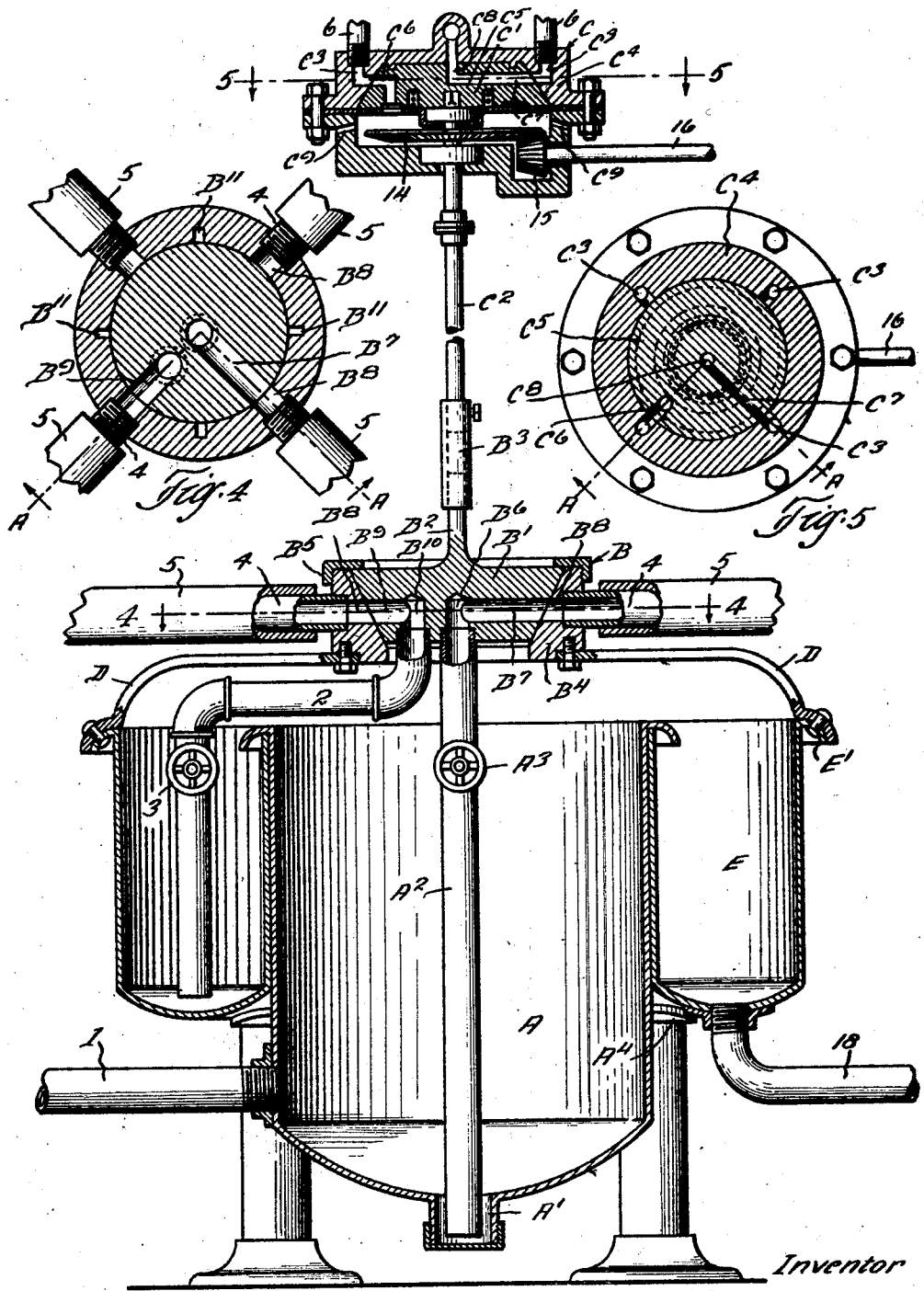

Patented Feb. 19, 1929.

1,702,897

UNITED STATES PATENT OFFICE.

BARGE L. HARTZ, OF ELYRIA, OHIO, ASSIGNOR TO THE PFAUDLER CO., OF ROCHESTER, NEW YORK, A CORPORATION OF NEW YORK.

SYSTEM OR APPARATUS FOR HOLDING MILK.

Application filed June 1, 1925. Serial No. 34,265.

This invention relates to systems for holding milk in connection with the process of pasteurizing the same, and has for its general object to increase the efficiency of such apparatus in the particulars which will be pointed out hereinafter.

In commercial pasteurizing systems, the milk is conveyed from a heater to holding tanks wherein the milk is held for a predetermined time and then released and conveyed to a cooler. The movement of the milk from the heater to the holding tanks is automatically controlled by a timed, distributing valve. My invention relates to the means for supplying the heated milk to a plurality of holding tanks; to the means for emptying the said holding tanks; and to certain constructions and arrangements of the apparatus which will prevent, in automatic systems of the type referred to, the delivery to any of the holding receptacles of anything but the heated milk which is intended therefor. The invention also includes certain constructions, combinations, and arrangements of parts which will be pointed out in connection with the detailed description of the system shown in the drawings, wherein Fig. 1 represents a plan view of such system; Fig. 2 a side view of the said system; Fig. 3 a central vertical section through the central receiving and delivering tanks and through the valve mechanisms thereabove, the sections through the valves corresponding substantially to the lines A—A of Figs. 4 and 5 but the parts of the valves being shown in the positions which they would occupy if the said lines cut the said valves diametrically; Fig. 4 a sectional view corresponding to the line 4—4 of Fig. 3; and Fig. 5 a similar view corresponding to the line 5—5 of Fig. 3.

The system comprises generally a plurality of holding tanks (four such tanks being shown for purposes of illustration); a distributing tank to which the heated milk is supplied and from which it is delivered successively to the holding tanks by means of a timed automatically operating valve; a vacuum tank connected with the tops of the holding tanks and also connected with a vacuum-producing pump; a timed automatically-operating valve for placing the holding tanks successively in connection with the vacuum tank; a receiving tank (preferably surrounding the distributing tank) and adapted to receive milk after it has been held for a predetermined length of time in the various holding tanks; and various details of construction and arrangements of parts which enable the system to operate in a novel and efficient manner.

Describing the various parts by reference characters, 1 denotes a pipe through which the heated milk is delivered into the central distributing tank A. This tank is provided with a central well A′ into which there projects a pipe $A^2$ having a valve $A^3$ therein and depending from the bottom of the rotating body B′ of a valve, indicated generally at B and located directly above the said tank. This valve body is connected by a stem $B^2$ and a slip-coupling $B^3$ with the stem $C^2$ of the body C′ of a vacuum controlling valve, indicated generally at C and located directly above the valve B. The valve $A^3$ regulates the flow of milk to the holding tanks, enabling them to be filled to full or less capacity.

As will appear more particularly from Figs. 3 and 4, the valve body B′ is of inverted frusto-conical shape and fits within an upwardly flaring seat in a surrounding annular body $B^4$, the parts being mounted within a casing $B^5$. The valves B and C and their associated parts are supported from a hood D which is shown as riveted to a flange E′ at the top of the annular receiving tank E which surrounds the tank A and is shown as supported therefrom by means of a flange $A^4$ projecting from the latter tank.

The top of the pipe $A^2$ communicates with a short vertical port $B^6$ in the valve body B′ and the upper end of this port communicates with a radial port $B^7$ which extends through the body B′ and is adapted to register successively with equi-distantly spaced ports $B^8$ in the surrounding body $B^4$, four such ports being shown, one for each of the holding tanks F. At 90° from the port $B^7$, the body B′ is provided with a port $B^9$ which is adapted to register successively with the ports $B^8$ and from which a vertical port $B^{10}$ and a pipe 2 having a valve 3 therein serve to deliver the milk from the receptacles F into the receiving receptacle E. The annular body $B^4$ is provided, between the ports or passages $B^8$ thereof, with notches $B^{11}$ which, in the event of any leakage from any of the tanks F by reason of back pressure therein, will permit such leakage to drop into the tank A.

From the tank A, the heated milk is supplied (by means to be described hereinafter) through the valve B successively to the tanks F, the valve body being connected with said tanks by pipes 4 which are adapted to register successively with the ports $B^7$ and $B^9$ in the valve body $B'$, the port $B^7$ serving to fill the said tanks while the port $B^9$ cooperates with the pipe 2 and the pipes 4 to empty the said tanks successively. Each of the pipes 4 is shown as covered with insulation 5, to prevent the cooling of the milk in passage therethrough and while held therein, and each tank F will also be provided with insulation, for the same purpose.

Each tank F is provided in the top thereof with an inwardly opening valve $F'$ which is adapted to admit air to the tank when a predetermined vacuum has been created therein by means of the vacuum pump and tank, to be described hereinafter. Each of the tanks F is also provided with a manhole having a cover $F^2$ whereby access may be had to the tank for cleaning purposes. Leading from each tank F to the top of the valve C is a pipe 6, each pipe having a vacuum gauge 7 therein and each communicating with a port $C^3$ which extends through the outer valve body $C^4$ and is adapted to register with the radial ports $C^6$ and $C^7$ in the interior rotatable valve body $C^5$, the latter body being frusto-conical in shape and fitting within a correspondingly shaped seat in the former body. The port $C^7$ communicates by a vertical central port $C^8$ with the pipe 8 leading to the vacuum tank G; the port $C^6$ extends through the bottom of the body $C'$ and communicates with a chamber formed within the valve, which chamber is provided with air inlet ports $C^9$. The pipe 8 is provided with a regulating valve 9 which is adapted to give a constant vacuum (say 10 inches) in the said pipe and in the tanks F during the filling and holding operations. In addition, a by-pass 10 having a valve 11 therein is provided between the tank G and the pipe 8, which will permit a greater vacuum to be used in the last-mentioned pipe, if desired. In addition, the pipe 8 is provided with an ordinary hand-operated valve 12.

The central arrangement of the valves B and C with respect to the tanks F facilitates the employment of pipes 5 which are of equal length, as is the case with the pipes 6. This arrangement enables the partial vacuum which is produced within the tanks F to be substantially uniform in all of said tanks.

The tank G is connected by a pipe 13 with a vacuum pump, indicated generally at H. This pump may be of any approved construction and is shown as driven by a motor I. The valve bodies $B'$ and $C'$ are driven by means of a bevel gear 14 on the shaft $C^2$ and a bevel pinion 15 on a shaft 16. The latter shaft is driven (preferably intermittently) by means of suitable gearing operated from the motor I. This gearing, being of well known construction, is not illustrated or described herein, since, in its details, it forms no part of my invention.

A pipe 18 leads from the receiving tank E to the cooler, before the milk is bottled or placed in other receptacles.

With the parts constructed, arranged, and operating in the manner described, the general operation of the apparatus will be as follows:

A sufficient vacuum having been created in the tank G by the pump H, the valve 12 will be opened and the particular tank F which is connected by the valve B with the tank A and by the valve C with the tank G, will be filled to the desired height. When one of the tanks F is filled, the valves B and C will be rotated an appropriate distance to enable the next tank F in the series to be filled while entirely cutting off the supply of milk to all other tanks. With the number of tanks and valve ports shown herein, when the valves B and C shall have been rotated a complete turn in a clockwise direction, the discharging port $B^9$ will be brought into register with the pipe 4 of the first tank F that has been filled or charged and the venting port $C^6$ will be brought into register with the pipe 6 of the same tank, thereby enabling the milk to be discharged from said tank. After this first rotation of the valves B and C, the operation will be continuous, the said valves serving to empty a holding tank after the milk therein shall have been held for the necessary period (30 minutes) while the tank next therebehind is being filled. With the number of holding tanks and valve ports given herein, the valves will be given a complete rotation every hour with an approximately fifteen-minute rest between the successive rotary movements thereof. This will enable the milk to be held for thirty minutes in each of the tanks F. Where five tanks F are used, the valves B and C will be given a complete rotation every hour and the intervals between successive rotative steps will be approximately ten minutes; and where six tanks F are used, the rest-intervals between successive rotative steps of the valves will be approximately seven and one-half minutes.

The valve $A^3$ will be set so as to enable each tank F to be filled to the desired height during the period of time permitted by the valves B and C for the filling operation. Furthermore, as has been pointed out hereinbefore, the pipes 4 are equal in length, as are also the pipes 6; hence it follows that, with other conditions the same, the holding tanks will be held under the same degree of vacuum and will be filled to the same height through the filling or charging operation.

The tank A is of such capacity as to accommodate a constant flow of milk thereinto, notwithstanding the fact that the valves B and C are being operated intermittently to deliver milk therefrom to the tanks F.

The valve 3 serves generally to relieve the tanks F at a rate proportional to the supply through the pipe A² and valve A³, whereby the rate of supply and delivery are balanced and the tank E is prevented from overflowing.

Unless there is some leakage into the tanks F, there will be no back pressure of the milk in said tanks upon the valve B prior to the emptying operation. However, should such back pressure occur and should there be any leakage through the valve B, this leakage will be delivered into the distributing tank A, whence it will be delivered in turn to another tank for holding. This will merely result in having such milk held for a longer period than if the leakage had not occurred and will not detrimentally affect the complete pasteurization of the milk. Furthermore, with a valve B of the type shown herein and the employment of a vacuum system, the amount of such leakage is necessarily very small.

The vacuum tank G is preferably of the same capacity as each of the tanks F, which will enable the filling operation to be initiated promptly in each of the latter tanks and will enable each tank to be filled to the desired height within the time allotted therefor.

The valve assembly B and C is braced by the pipes 5, 6 and 8 and by the shaft 16; also by rods 17 secured to the casing of the valve C and to the tanks F.

Among the advantages realized by my system are the following:

(a) The filling, holding, and emptying operations proceed continuously and under automatic control, without the danger of holding any of the milk for less than the required time (b) The capacity of the system may be varied conveniently and at will to enable the tanks F to be charged with a small or a large volume of milk, as may be desired; and this change or adjustment may be readily accomplished at the beginning of any cycle of operation.

(c) The construction and arrangement is such that the capacity of the system may be readily increased by merely installing additional holding tanks, with corresponding changes in the valves B and C and the pipe connections.

(d) The elimination of foaming, due to the employment of the vacuum system for filling and for holding the milk.

(e) Compactness and simplicity of construction.

(f) The coupling of the vacuum and milk-distributing valves, with the location of the driving mechanism (which has to be oiled) in the casing of the former valve.

(g) Complete emptying of the tanks F at the end of the holding operation.

(h) Practically complete emptying of the tank A at the end of the operation, due to the well A' and the extension of the central pipe A² thereinto.

Having thus described my invention, what I claim is:

1. In a system or apparatus for holding milk, the combination of a distributing tank, a receiving tank, a plurality of holding tanks, valve mechanism, a pipe connecting the distributing tank with the said valve mechanism pipes leading from the said valve mechanism to the holding tanks and adapted and arranged to be placed successively in communication with said distributing tank and with said receiving tank by said valve mechanism, vacuum producing means, a second valve mechanism, a pipe connecting the said means with the latter mechanism, and pipes connecting the latter mechanism with the said holding tanks, the last mentioned valve mechanism being arranged to place the holding tanks successively in communication with the pipe leading thereto and with the atmosphere, and means for driving said valve mechanisms.

2. In a system or apparatus for holding milk, the combination of a distributing tank, a receiving tank, a plurality of holding tanks above the first mentioned tanks, a valve, a pipe leading to said valve from the distributing tank, pipes leading from said valve to the bottoms of the holding tanks, the said valve having a rotatable body provided with a passage adapted to place the first-mentioned pipe successively in communication with the pipes leading to the holding tanks and with a passage adapted to place the last mentioned pipes successively in communication with the receiving tank, vacuum-producing means, a valve, a pipe leading from said means to the second valve, pipes leading from the second valve to the upper portions of the holding tanks, the second valve having a rotatable body provided with a port or passage adapted to register successively with the pipe leading to such second valve and with the pipes leading therefrom to said holding tanks, the second valve having also a venting port or passage adapted to register successively with the last mentioned pipes, and means for driving the said rotatable valve bodies in unison.

3. In a system or apparatus for holding milk, the combination of a distributing tank, a plurality of holding tanks, a valve, a pipe leading to said valve from the distributing tank, pipes leading from said valve to the said holding tanks, the said valve having a rotatable body provided with a passage adapted to place the first-mentioned pipe successively in communication with the pipes leading to the holding tanks and with a passage adapted to place the last mentioned pipes successively in communication with a delivery outlet, vacuum-producing means, a valve, a pipe leading from said means to the second valve, pipes leading from the second valve to the holding tanks, the second valve having a rotatable body provided with a port or passage adapted to register successively with the pipe leading to such second valve and with the pipes leading therefrom to said holding tanks, the second valve having also a venting port or passage adapted to register successively with the last mentioned pipes, and means for driving the said rotatable valve bodies.

4. In an apparatus or system for holding milk, the combination of a plurality of holding tanks, a pipe leading from the bottom of each of said tanks, a valve to which the opposite ends of said pipes are connected, vacuum-producing means, a second valve, a pipe connecting the second valve with said means, pipes leading from such second valve to the said holding tanks, each of the said valves comprising a rotatable body and each body having a port adapted to register successively with the pipes leading to the holding tanks, the second valve body having also a venting port adapted to register successively with the pipes cooperating therewith and the first-mentioned valve body having a milk delivery passage or port adapted to register successively with the pipes leading therefrom to the holding tanks, means for supplying milk to be held to the first-mentioned valve, and means for driving said valve bodies.

5. In an apparatus or system for holding milk, the combination of a plurality of holding tanks, a pipe leading from each of said tanks, a valve with which the opposite ends of said pipes are connected, vacuum-producing means, a second valve, a pipe connecting the second valve with said means, pipes leading from such second valve to the said holding tanks, each of the said valves comprising a rotatable body and each body having a port adapted to register successively with the pipes leading to the holding tanks, the second valve body having also a venting port adapted to register successively with the pipes cooperating therewith and the first-mentioned valve body having a milk delivery passage or port adapted to register successively with the pipes leading therefrom to the holding tanks, a tank below the first-mentioned valve, a pipe supplying milk to be held from said tank to the first-mentioned valve, and means for driving said valves in unison.

6. In a system or apparatus for holding milk, the combination of a distributing tank, a valve thereabove, a pipe connecting the said tank with said valve, a receiving tank surrounding the distributing tank, a plurality of holding tanks, pipes leading from said valve to the bottoms of said holding tanks, the said valve having a rotatable body provided with a port adapted to register successively with the pipes leading to the holding tanks, a pipe leading from the first tank to said port and the said valve body having another port also adapted to register successively with the pipes leading to the holding tanks and a pipe connected with the last mentioned port and adapted to deliver milk into the second tank, a vacuum tank, a second valve, a pipe leading from said vacuum tank to the second valve, pipes leading from the last mentioned valve to the holding tanks, the last mentioned valve having a rotatable body provided with a port adapted to place the last mentioned pipes successively in communication with the pipe leading to the vacuum tank and the said body also having a venting port adapted to register successively with the said pipes leading to the holding tanks, and means for driving the rotatable valve bodies in unison.

7. In a system or apparatus for holding milk, the combination of a distributing tank, a valve thereabove, a pipe connecting the said tank with said valve, a plurality of holding tanks, pipes leading from said valve to the said holding tanks, the said valve having a rotatable body provided with a port adapted to register successively with the pipes leading to the holding tanks and with the pipe leading from the first tank to said port and the said valve body having another port also adapted to register successively with the pipes leading to the holding tanks and a pipe connected with the last-mentioned port and adapted to deliver milk from the holding tanks, vacuum-producing means, a second valve, a pipe leading from said means to the second valve, pipes leading from the second valve to the holding tanks, the second valve having a rotatable body provided with a port adapted to place the last mentioned pipes successively in communication with the pipe leading to the vacuum-producing means and the said body also having a venting port adapted to register successively with the said pipes leading to the holding tanks, and means for driving the rotatable valve bodies.

8. In an apparatus or system for holding milk, the combination of a distributing tank, a plurality of holding tanks, a valve above said distributing tank and below the holding tanks, a pipe for supplying milk from the distributing tank to the said valve, pipes leading from said valve to the said tanks, means for operating the said valve to permit milk supplied thereto to be delivered successively to the holding tanks and to permit the milk so supplied to said holding tanks to be drained through said valve, and means for operating the said valve.

9. In a system or apparatus for holding milk, the combination of a distributing tank, a valve thereabove, a plurality of holding tanks above the said valve and pipes connecting the said tanks with the said valve, a pipe leading from the distributing tank to the said valve, the said valve having a rotatable body provided with a port adapted to register with the last-mentioned pipe and with each of the other pipes in succession, means for causing milk to flow through said valve and pipes into said holding tanks, a tank surrounding the first mentioned tank, and a pipe carried by the rotating body of said valve and arranged to deliver into the second tank, the said valve having a port communicating with the last mentioned pipe and adapted to register successively with the pipes leading to the holding tanks.

10. In a system or apparatus for holding milk, the combination of a distributing tank, a valve, a plurality of holding tanks and pipes connecting the said tanks with the said valve, a pipe leading from the distributing tank to the said valve, the said valve having a rotatable body provided with a port adapted to register with the last-mentioned pipe and with each of the other pipes in succession, and vacuum producing means for causing milk to flow through said valve and pipes into said holding tanks, the said rotatable body having a delivery port adapted to register successively with the pipes leading to the holding tanks.

11. In a system or apparatus for holding milk, the combination of a distributing tank, a receiving tank surrounding the distributing tank, a plurality of holding tanks above the distributing and receiving tanks, a valve below the holding tanks and above the distributing and receiving tanks, the said valve comprising a central rotatable body and a body surrounding such central body, pipes extending from the surrounding portion of said valve to the holding tanks, the said portion of said valve having ports therethrough and the rotatable body of said valve having a port extending from the center to the periphery thereof and adapted to register successively with the first mentioned ports, a pipe connected to the central portion of the rotatable valve body and extending to the bottom of the distributing receptacle and adapted to deliver milk to the port in said body, a valve in the last-mentioned pipe, a pipe also projecting from such rotatable body to the receiving tank and a valve in such pipe, the said rotatable body having a port with which the last-mentioned pipe communicates and which is adapted to register successively with the ports in the surrounding portion of said valve, and means whereby milk may be supplied from the pipe which projects into the distributing tank through the valve to the holding tanks and may be delivered from said tanks through said valve and the pipe which projects from the rotatable body thereof to the receiving tank.

12. In a system or apparatus for holding milk, the combination of a distributing tank, a receiving tank surrounding the distributing tank, a plurality of holding tanks above the distributing and receiving tanks, a valve below the holding tanks and above the distributing and receiving tanks, the said valve comprising a central rotatable body and a body surrounding such central body, pipes extending from the surrounding portion of said valve to the holding tanks, the said portion of said valve having ports therethrough and the rotatable body of said valve having a port extending from the center to the periphery thereof and adapted to register successively with the first mentioned ports, a pipe connected to the central portion of the rotatable valve body and extending into the distributing receptacle and adapted to deliver milk to the port in said body, a pipe also projecting from such rotatable body to the receiving tank, the said rotatable body having a port with which the last-mentioned pipe communicates and which is adapted to register successively with the ports in the surrounding portion of said valve, and means whereby milk may be supplied from the pipe which projects into the distributing tank through the valve to the holding tanks and may be delivered from said tanks through said valve and the pipe which projects from the rotatable body thereof to the receiving tank.

13. In an apparatus or system for holding milk, the combination of a plurality of holding tanks, a rotatable valve adapted to control the supply of milk to and from the said tanks in succession, vacuum-producing means, a second rotatable valve, a pipe connecting the said means and the second valve, means controlled by the rotation of the second valve for connecting the holding tanks successively with the said vacuum-producing means, means controlled by the rotation of the second valve for venting the said holding tanks successively to permit the discharge of the milk therefrom, means for driving the second valve, and connections between the two valves whereby they may be driven in unison.

14. In an apparatus or system for holding milk, the combination of a plurality of holding tanks, a rotatable valve adapted to control the supply of milk to and from the said tanks in succession, means including the said valve for supplying milk to and from said tanks, a vacuum tank, a pump connected thereto, a second rotatable valve, a pipe connecting the said vacuum tank and the second valve, a pressure-regulating valve in said pipe, a by-pass connecting said pipe and said tank, means controlled by the rotation of the last mentioned valve for connecting the holding tanks successively with the vacuum tank, means controlled by the rotation of the second valve for venting the said holding tanks successively to permit the discharge of the milk therefrom, means for driving the second valve, and a connection between the first and second valves whereby they may be driven in unison.

15. In an apparatus or system for holding milk, the combination of a distributing tank, a receiving tank surrounding the distributing tank, a valve above the distributing tank, a pipe connecting the said valve with the distributing tank, a pipe leading from said valve to the receiving tank, a valve in each of said pipes, a plurality of holding tanks located above the said valves, a pipe leading from the first valve to said holding tanks, the said first valve comprising a rotatable body having a port arranged to place the first mentioned pipe and the second mentioned pipe successively in communication with the pipes leading from the valve to the holding tanks, and means whereby the milk in the distributing tanks may be fed from the pipe therein through the said first valve to the holding tanks in succession and the milk may be delivered from said tanks in succession through said valve and the pipe leading therefrom to the receiving tank.

16. In an apparatus or system for holding milk, the combination of a distributing tank, a valve above said tank, a pipe connecting the said valve and the said tank, a plurality of holding tanks above the distributing tank, pipes connecting the said tanks with the said valve, the said pipes being of equal length and the said valve comprising a rotatable body having a port adapted to register with the first mentioned pipe and with the other pipes in succession and being also provided with a second port adapted to register with the second-mentioned pipes successively and a pipe communicating with the second port, vacuum-producing means, a pipe leading from said means, a valve having a rotatable body provided with a port communicating with the last-mentioned pipe, pipes of equal length leading from the last-mentioned valve to the holding tanks and arranged to register successively with the last-mentioned port, the rotatable body in the last mentioned valve being also provided with a venting port which is adapted to register successively with the pipes leading from such valve to the holding tanks, and means for driving the said valves.

17. In an apparatus or system for holding milk, the combination of a plurality of holding tanks, a rotatable valve located below the said tanks, a pipe leading to said valve for supplying milk to the said tanks, the said valve having ports arranged to supply milk successively to said tanks as well as to permit the flow of milk from said tanks through said valve, vacuum-producing means, and connections between the said vacuum-producing means and the said tanks permitting milk supplied to the said valve to be delivered successively to said tanks and to be emptied therefrom through said valve after the milk shall have been held a predetermined length of time in the said tanks.

18. In combination with an apparatus for holding milk, valve means for charging each of a series of compartments successively at timed intervals, said valve means comprising means for applying vacuum to effect the charging of each compartment, and means for breaking the vacuum.

19. In a pasteurizer holding system, the combination of a plurality of holding tanks, a source of liquid supply, means connecting said tanks to said source of liquid supply, and means for reducing the pressure successively in each of said tanks below the pressure of said source of liquid supply, to tend to draw liquid from said source of supply into said tanks.

20. In a pasteurizer holding system, the combination of a plurality of holding tanks, a source of liquid supply, means connecting said tanks to said source of liquid supply, a source of vacuum, and means for connecting each of said tanks in succession to said source of vacuum, to tend to draw liquid from said source of supply into the tank connected to said source of vacuum.

21. In a pasteurizer holding system, the combination of a plurality of holding tanks, a source of liquid supply, means connecting said tanks to said source of liquid supply, a source of vacuum, valve means for connecting each of said tanks in succession to said source of vacuum to tend to draw liquid from the source of supply into the tank connected to the source of vacuum, and means for moving said valve means in accordance with a predetermined time schedule to establish the successive connection between the tanks and the source of vacuum at predetermined intervals.

22. In a pasteurizer holding system, the combination of a plurality of holding tanks, a source of liquid supply, means connecting said tanks to said source of liquid supply, a source of vacuum, and means for successively connecting any one of said tanks to said source of vacuum to tend to draw liquid from said source of supply into said tank, disconnecting said tank from the source of vacuum and holding the vacuum in said tank during a predetermined interval, and connecting said tank to the atmosphere to break the vacuum in the tank to permit discharge of liquid therefrom.

23. In an apparatus for treating liquids, the combination with a plurality of liquid holding tanks, of liquid conduit means connected to said tanks, means for intermittently lowering the pressure in said tanks below the pressure in said liquid conduit means to tend to draw liquid from said conduit means into said tanks, and a valve in said conduit means for regulating the rate of flow therethrough in response to said reduced pressure.

24. In an apparatus for treating liquids, the combination with a plurality of liquid holding tanks, of a source of liquid supply, conduit means connecting said tanks to said source of liquid supply, a source of vacuum, means for connecting each of said tanks in succession to said source of vacuum for a predetermined time interval to tend to draw liquid from said source of supply into the tank connected to the source of vacuum, and a valve in said conduit means for regulating the rate of flow therethrough to control the amount of liquid entering each tank during said time interval.

25. The method of treating milk which comprises connecting a milk holding tank to a source of milk supply, creating a partial vacuum in said tank to draw milk thereinto from the source of supply, holding the milk in said tank for a predetermined interval, and discharging the milk therefrom.

26. The method of treating milk which comprises creating a partial vacuum in one of a plurality of milk holding tanks to draw milk thereinto from a source of supply, holding the milk in said tank and creating a partial vacuum in a second tank to draw milk thereinto, subsequently discharging the milk from the first tank while holding the milk in the second tank, and discharging the milk from the second tank.

27. In a pasteurizer holding system, the combination of a plurality of holding tanks, a source of liquid supply, means for connecting said tanks to said source of liquid supply, a source of vacuum, means for connecting said tanks successively to said source of vacuum, to tend to draw liquid from said source of supply into the tank connected to said source of vacuum, discharge means, and means for causing flow of liquid from successive tanks to said discharge means.

28. In a pasteurizer holding system, the combination of a plurality of holding tanks, a source of liquid supply, means for connecting said tanks to said source of liquid supply, a region of pressure less than the pressure on said source of liquid supply, means for connecting said tanks successively to said region of pressure to tend to draw liquid from said source of supply into said tanks, gravity discharge means, and means for connecting said tanks successively to said discharge means to discharge liquid from said tanks by gravity.

29. In a pasteurizer holding system, the combination of a plurality of holding tanks, a source of liquid supply, means for connecting said tanks to said source of liquid supply, a region of pressure less than the pressure on said source of liquid supply, discharge means, and valve means for connecting said tanks successively to said region of pressure, to tend to draw liquid from said source of supply into said tanks, and for causing flow of liquid from successive tanks to said discharge means for discharging the liquid from said tanks.

30. In a pasteurizer holding system, the combination of a plurality of holding tanks, a source of liquid supply, means for connecting said tanks to said source of liquid supply, a region of pressure less than the pressure on said source of liquid supply, discharge means, valve means for connecting said tanks successively to said region of pressure, to tend to draw liquid from said source of supply into said tanks, and for causing flow of liquid from successive tanks to said discharge means for discharging the liquid from said tanks, and means for operating said valve means in accordance with a predetermined time schedule to produce substantially continuous flow of liquid from said source of liquid supply toward said tanks, and substantially continuous flow of liquid from said tanks toward said discharge means.

In testimony whereof, I hereunto affix my signature.

BARGE L. HARTZ.